United States Patent [19]
Akiba et al.

[11] Patent Number: 5,146,441
[45] Date of Patent: Sep. 8, 1992

[54] SUPPORTING DEVICE OF AN OPTICAL PICKUP

[75] Inventors: Taichi Akiba; Yoshitsugu Araki; Toshihiko Kurihara, all of Saitama, Japan

[73] Assignee: Pioneer Electronic Corporation, Tokyo, Japan

[21] Appl. No.: 659,654

[22] Filed: Feb. 25, 1991

[30] Foreign Application Priority Data

May 26, 1990 [JP] Japan ............................... 2-135726
Dec. 17, 1990 [JP] Japan ............................... 2-417870

[51] Int. Cl.$^5$ ............................................. G11B 7/00
[52] U.S. Cl. ................................. 369/44.15; 369/44.32
[58] Field of Search ............... 369/44.15, 44.16, 44.19, 369/44.32, 112; 359/813, 823, 824

[56] References Cited

U.S. PATENT DOCUMENTS 4,135,083  1/1979  Van Alem et al. .................. 369/112
5,036,507  7/1991  Yamashita ......................... 369/44.32

FOREIGN PATENT DOCUMENTS 61-196434  8/1986  Japan ............................. 369/44.32
2143973    2/1985  United Kingdom ............. 369/44.19

OTHER PUBLICATIONS 61-196434, Aug. 30, 1986, Japan Abstract, 369-42.32.

*Primary Examiner*—Donald McElheny, Jr.
*Attorney, Agent, or Firm*—Marmelstein, Murray & Oram

[57] ABSTRACT

An optical pickup has a suspension base, a holder suspended from the suspension base by wires in a form of a cantilever. The optical pickup is slidably mounted on a guide shaft. The guide shaft is pivoted so that an optical axis of an optical system becomes perpendicular to an optical disk. The holder is provided to be tilted in a radial plane with respect to the optical disk when the holder is moved for focusing the optical system.

2 Claims, 6 Drawing Sheets

SUPPORTING DEVICE OF AN OPTICAL PICKUP

BACKGROUND OF THE INVENTION

The present invention relates to a supporting device of an optical pickup for reproducing data on an optical disk such as a compact disk (CD) and a laser disk (LD).

The pickup is supported by a tilt adjusting device for adjusting the optical axis of an optical system of the pickup to the inclination of the disk.

FIG. 7 shows a tilt adjusting device. A holder 1 of an optical pickup P is secured to a carriage 9b which is adapted to be traveled along a guide shaft 9a. An end of the guide shaft 9a is secured to a rotating shaft 9d, which is supported in a supporting device 9c, thereby supporting the guide shaft 9a in the form of a cantilever. The rotating shaft 9d is provided to be pivoted by a driving device provided in the supporting device 9c. An optical disk D is supported by a clamper 9f and rotated by a spindle motor 9e.

Inclination of the disk D is detected by a sensor (not shown). For example, when the disk D is inclined from a horizontal line D, as shown in FIG. 8, the guide shaft 9d is pivoted from a horizontal position 9a, to an inclined position 9a by the driving device in the supporting device 9c so that the optical axis O of an optical system P1 of the pickup is tilted to a perpendicular position with respect to the inclined disk D. Furthermore, the holder 1 is moved along the optical axis O so as to focus the optical system P1 as shown by dot-dash line in FIG. 8.

However, the moving distance of the holder 1 at the focusing is relatively long because the holder 1 is moved along the optical axis O only. Consequently, a driving device including a focusing coil, magnet and circuit for moving the holder becomes large in size.

SUMMARY OF THE INVENTION

The object of the present invention is to provide a supporting device of the optical disk in which the focusing distance of a pickup along the optical axis may be reduced, whereby the pickup can be miniaturized.

According to the present invention, there is provided a supporting device of an optical pickup for reproducing data on an optical disk, the optical pickup having a suspension base, a holder suspended from the suspension base by wires in a form of a cantilever, an optical system provided in the holder, and focusing means for moving the holder so as to focus the optical system with respect to the optical disk.

The device comprises a guide shaft slidably mounting the optical pickup, a rotating shaft provided adjacent a center of the optical disk and supporting the guide shaft, driving means for pivoting the rotating shaft to move the guide shaft so that an optical axis of the optical system becomes perpendicular to the optical disk, tilting means for titling the holder in outward direction with respect to the center of the optical disk when the holder is moved for focusing the optical system.

In an aspect of the invention, the tilting means is a flexible wiring plate provided between the holder and the suspension base for supplying current to the holder.

The other objects and features of this invention will become understood from the following description with reference to the accompanying drawings.

DETAILED DESCRIPTION OF THE PREFERRED EMBODIMENT

Figure 1:
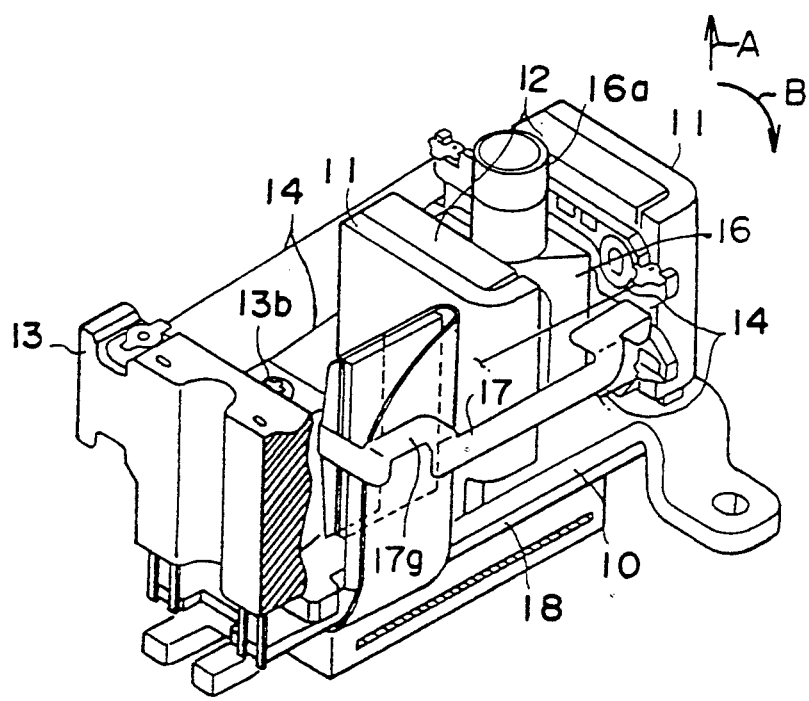
FIG. 1 is a perspective view of an optical pickup used in a device according to the present invention.
Figure 2:
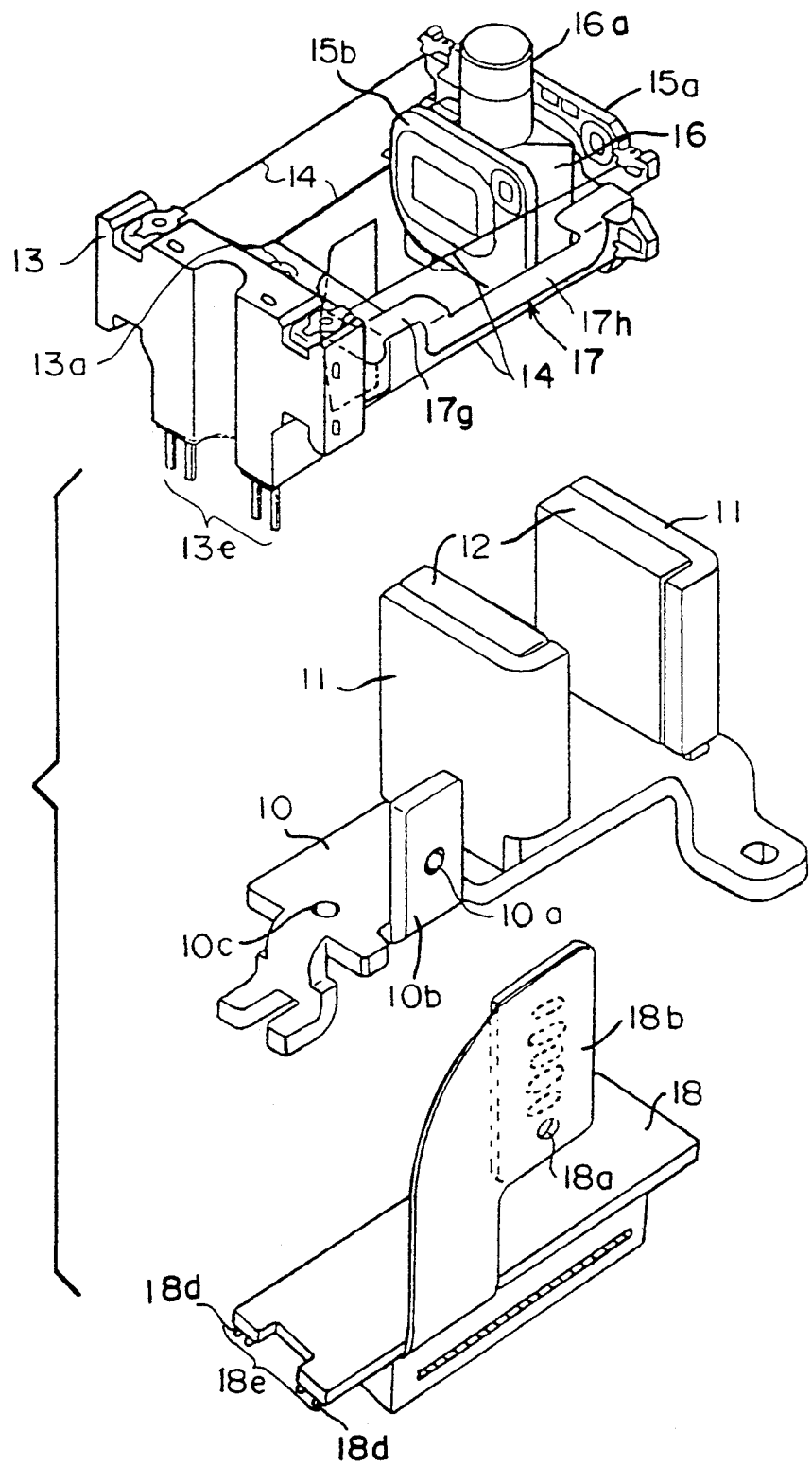
FIG. 2 is a exploded perspective view of the optical pickup.

Referring to FIGS. 1 and 2, the optical pickup according to the present invention comprises the holder 16, a suspension base 13, a yoke base 10, and a circuit substrate 18. The holder 16 has an optical system 16a and a pair of coil substrates 15a and 15b. On each coil substrate, an exciting coil (not shown) is mounted. The holder 16 is suspended from the suspension base 13 made of plastic by four conductive spring wires 14 in the form of a cantilever. Four terminals 13e each connected to the conductive wire 14 are embedded in the suspension base 13 by insert molding. The yoke base 10 has a pair of yokes 11, each having a magnet 12. The yoke base 10 is secured to the underside of the suspension base 13 by a screw 13b engaged with a hole 13a of the base 13 and a hole 10c formed in the yoke base 10. Both the magnets 12 are positioned adjacent the coil substrates 15a and 15b, respectively.

The circuit substrate 18 has an attaching plate 18b having a hole 18a and a pair of terminal portions 18e. The circuit substrate 18 is secured to the yoke base 10 by a screw (not shown) engaged with a hole 10a formed in attaching plate 10b of the yoke base 10 and in the hole 18a.

Figure 4:
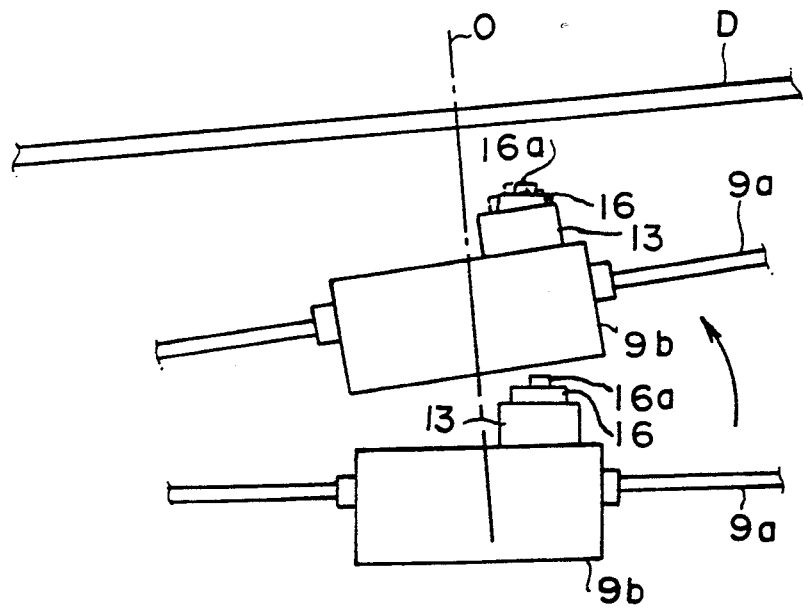
FIGS. 4 and 5 are side views showing a supporting device according to the present invention.

An exciting current is supplied to the coil substrates 15a and 15b through conductive wires 14. A circuit (not shown) in the optical system 16a is connected to terminals 13e of the suspension base 13 through a flexible wire plate 17. The flexible wiring plate 17 is disposed on one of the longitudinal sides of the pickup. Each of the terminals 13e is soldered to an end of a corresponding wire 18d on the circuit substrate 18. As shown in FIG. 4, the pickup is mounted on the carriage 9b by securing the yoke base 10 to the carriage. The pickup is disposed such that the wires 14 and plate 17 are arranged in the tangential direction of the disk D.

The flexible wiring plate 17 comprises a pair of horizontal planes 17g disposed perpendicularly to the focusing direction, and a vertical plane 17h perpendicular to the tracking direction disposed between the horizontal planes 17g.

Figure 3:
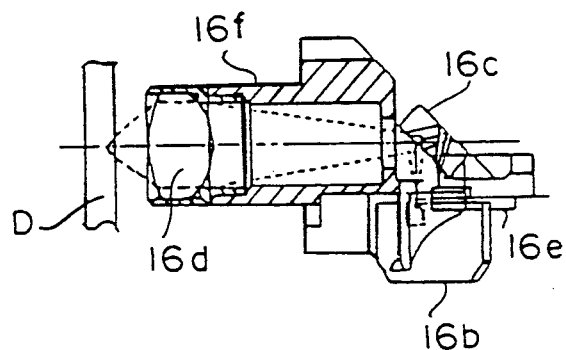
FIG. 3 is a sectional view of an optical system.

Referring to FIG. 3 showing the optical system 16, the system comprises a light emitting element 16b for emitting a laser beam, a mirror 16c for reflecting the laser beam to the disk D, an objective 16d for focusing the laser beam on the disk D, and a light receiving element 16e for receiving the reflected beam from the disk D. These components are provided in a plastic body 16f.

The laser beam from the light emitting element 16b is reflected on the mirror 16c to the disk D and focused on the disk D by the objective 16d. The reflected beam from the disk D passes through the objective 16d and is reflected to the light receiving element 16e by the mirror 16c. The circuit including the light emitting element 16b and light receiving element 16e is connected to the terminals 13e through the flexible wiring plate 17.

In operation, the optical pickup is moved in the radial direction of the disk D to a predetermined position by a driving device (not shown), where data on the disk is read by the pickup.

The laser beam from the light emitting element 16b is reflected on the mirror 16c to the disk D and focused on the disk D by the objective 16d. The reflected beam from the disk D passes through the objective 16d and is reflected to the light receiving element 16e by the mirror 16c.

Figure 7:
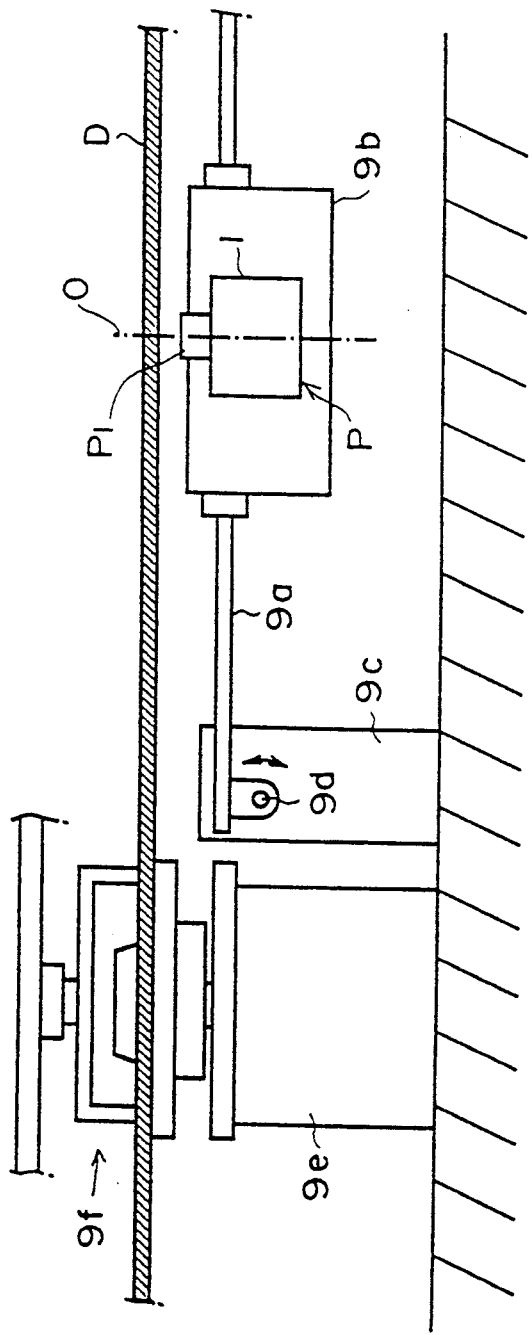
FIGS. 7 and 8 are side views showing a conventional supporting device.

In accordance with the light receiving element 16e, exciting currents are supplied to a focusing coil and a tracking coil on the coil substrates 15a and 15b, so that the holder 16 is moved so as to perform the focusing and tracking of the pickup. When the disk D is tilted as shown in FIG. 4, the guide shaft 9a is inclined by the driving device (FIG. 7) for adjusting the tilt of the pickup. In accordance with the present invention, the focusing operation is performed at the same time as the tilt adjusting operation.

Figure 5:
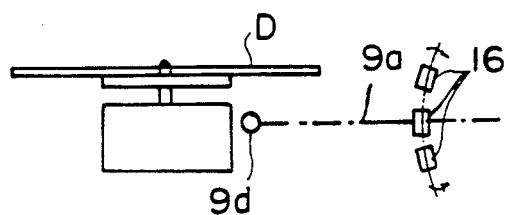

The flexible wiring plate 17 is bent when the holder 16 is moved apart of a neutral position. Since the flexible wiring plate 17 is disposed on one of the longitudinal sides of the pickup, the restoring force of the flexible wiring plate exerts on the holder 16 so as to tilt it within a vertical and radial plane with respect to the disk D. For example, as shown by an arrow A in FIG. 1, when the holder 16 is upwardly moved, the holder 16 is tilted in the direction of an arrow B. In other words, as shown in FIG. 5, when the holder 16 is upwardly moved from the neutral position, the holder is tilted in the outward direction with respect to the center of the disk D. On the other hand, when the holder 16 is downwardly moved, the holder is inwardly tilted.

By combining the tilt of the holder at the focusing and the tilt of the holder at the tilt adjusting operation, the optical axis O of the optical system 16a is adjusted to a line perpendicular to the disk D. Since the holder 16 is tilted, the distance moved in the optical axis at focusing is reduced as described hereinafter.

Figure 6:
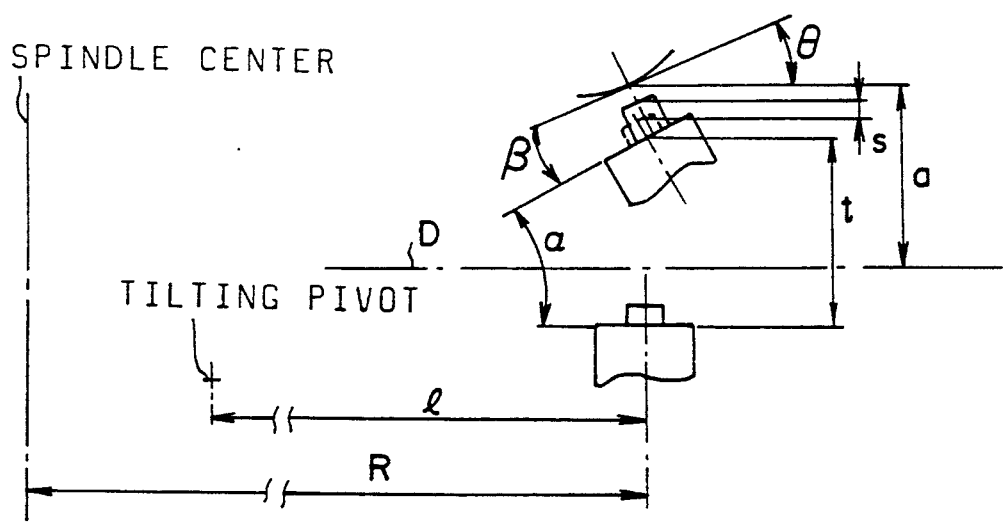
FIG. 6 is a diagram for explaining the operation of the supporting device.

In FIG. 6, if $\theta$ is the warping angle (rad.) of the disk D (counterclockwise direction is positive), a is the displacement of the disk D, l is the distance from the tilting pivot (9d) of the tilt adjustment, $\alpha$ is the correcting angle (rad.) at the tilt adjustment, t is the correcting height at the tilt adjustment, s is the displacement of the holder 16 at the focusing caused by the tilting of the optical axis of the optical system, $\beta$ is the tilting angle (rad.) of the optical axis (counterclockwise direction is positive), and $$K = \beta/s$$

$$a = t + s \quad (1)$$

$$\theta = \alpha - \beta \quad (2)$$

$$\beta = K \cdot s \quad (3)$$

$$t = l \cdot \tan\alpha \quad (5)$$

Since $\alpha < 1$, (if $\tan\alpha \approx \alpha$), the equation (4) is $$t = l \cdot \alpha \quad (5)$$

Therefore $$s = a - t = a - l \cdot \alpha = a - l \cdot (\theta + \beta) = a - l \cdot (\theta + K \cdot s)$$

Therefore $$s = (a - l \cdot \theta)/(1 + l \cdot K) \quad (6)$$

If the displacement of the holder is sO (assuming the optical axis does not tilt), and the tilt correcting angle $\alpha = 0$, $$\theta = a0$$

Therefore $$sO = a - l \cdot a0 = a - l \cdot \theta \quad (7)$$

$$\alpha - a0 = \alpha - \theta = \beta = K \cdot s \quad (8)$$

From the equation (6) and (7)

$$s = (1/(1 + l \cdot K)) \cdot sO \quad (9)$$

If $K > 0$ regardless of the directions of a and $\theta$, $$|s| < |sO|, |\alpha| < |aO|$$

Figure 8:
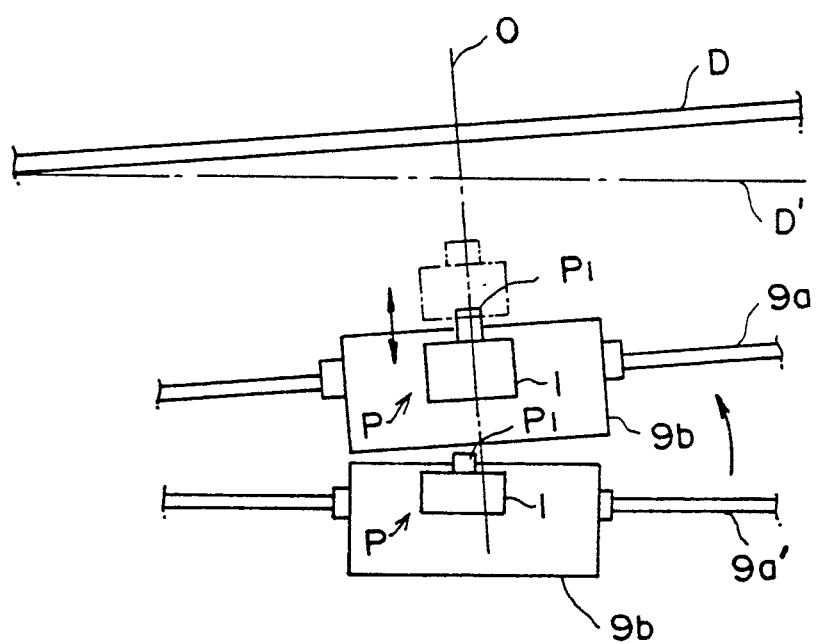

Therefore, when the holder 16 moves from the neutral position to the disk D, the holder is outwardly tilted with respect to the center of the disk. Consequently, the distance from the end of the optical system to the disk is more reduced compared with the conventional device of FIGS. 7 and 8 the optical axis of which does not tilt. Therefore, the focusing distance becomes short although tilting angle of the guide shaft 9a is large. Accordingly the optical pickup can be miniaturized.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A supporting device of an optical pickup for reproducing data on an optical disk, the optical pickup having a suspension base, a holder suspended from the suspension base by wires in a form of a cantilever, an optical system provided in the holder, and focusing means for moving the holder so as to focus the optical system with respect to the optical disk, comprising:

a guide shaft slidably mounting the optical pickup;

a rotating shaft provided adjacent a center of the optical disk and supporting the guide shaft;

driving means for pivoting the rotating shaft to move the guide shaft so that an optical axis of the optical system becomes perpendicular to the optical disk;

tilting means for tilting the holder in a vertical and radial plane with respect to the optical disk when the holder is moved for focusing the optical system.

2. The device according to claim 1 wherein the tilting means is a flexible wiring plate provided between the holder and the suspension base at one of sides of the pickup.

* * * * *